Figure 5:
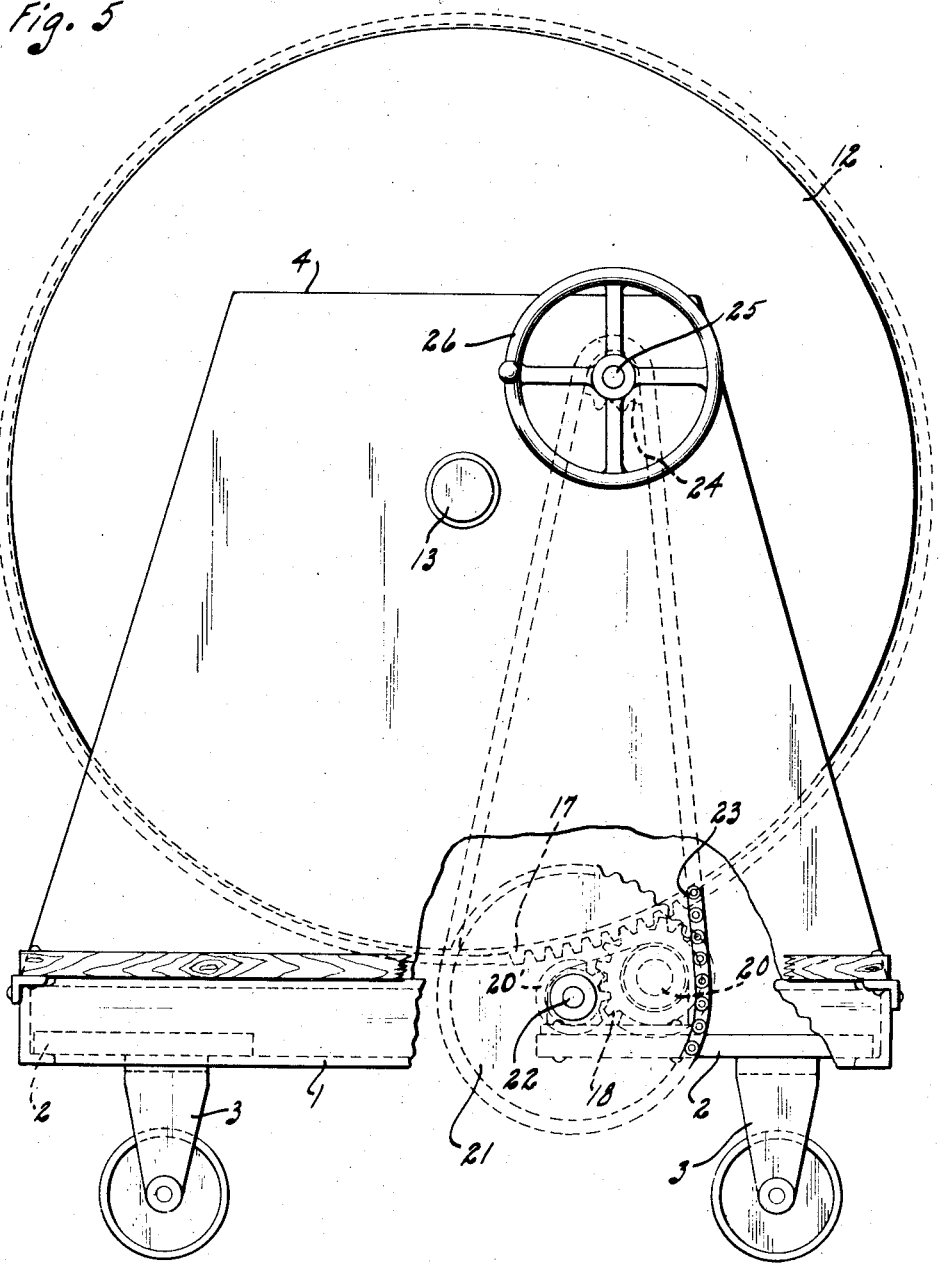

Nov. 12, 1935.  E. J. GRAY  2,020,830
SPOT WELDING FIXTURE
Filed Oct. 15, 1932  2 Sheets-Sheet 1
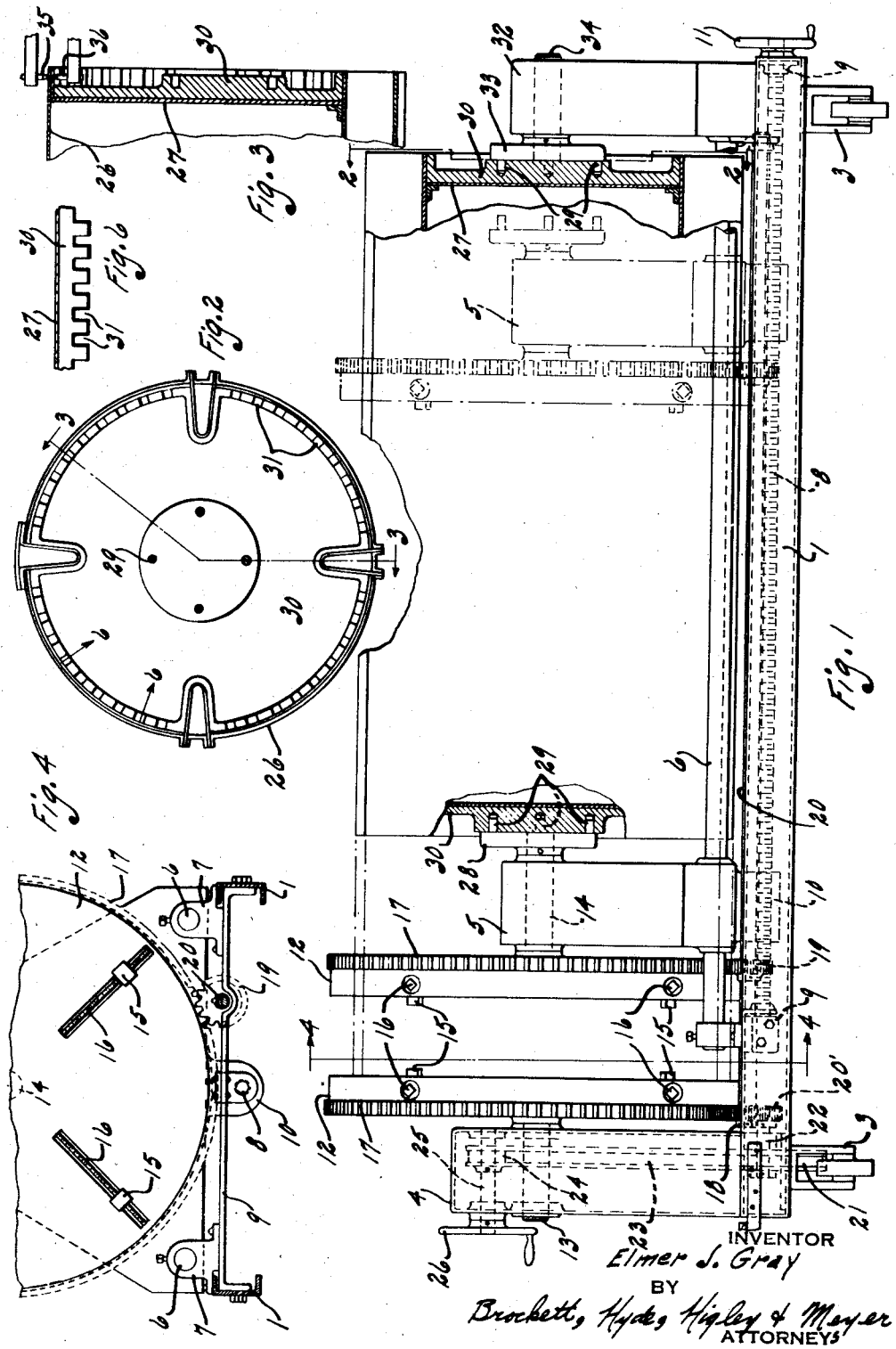
INVENTOR
Elmer J. Gray
BY
Brockett, Hyde, Higley & Meyer
ATTORNEYS Nov. 12, 1935.                E. J. GRAY                    2,020,830
                          SPOT WELDING FIXTURE
                         Filed Oct. 15, 1932        2 Sheets-Sheet 2

INVENTOR
Elmer J. Gray
BY
Brockett, Hyde, Higley & Meyer
ATTORNEYS

Patented Nov. 12, 1935

2,020,830

UNITED STATES PATENT OFFICE 2,020,830

SPOT WELDING FIXTURE

Elmer J. Gray, Cincinnati, Ohio, assignor to The American Laundry Machinery Company, Cincinnati, Ohio, a corporation of Ohio Application October 15, 1932, Serial No. 637,965

4 Claims. (Cl. 29—89)

My invention relates to work holding apparatus and, particularly, to the type of work holding apparatus disclosed in a copending application to Frank Vetorino, Serial No. 599,155, filed March 16, 1932, for Spot welding apparatus, wherein a work holding apparatus is provided that embodies means for supporting a partially or wholly fabricated cylinder framework of a washing machine or the like, such as the head sheets and work lifting ribs, in a predetermined position which renders the application and securing of the cylinder body sheets and other parts to the lifting ribs substantially easy, together with means for adjusting the cylinder framework to positions to bring the desired point thereon within the working range of a spot welding apparatus or the like.

It is the object of my invention to provide, in conjunction with such work holding apparatus, a supplemental or secondary work holding apparatus for supporting a partially fabricated cylinder and which will be of a nature to permit welds to be made at points that were inaccessible to the welding electrodes when the cylinder was in the primary work holding means. For example, this secondary work holding apparatus will permit welds to be made between the head sheets and the cylinder body sheets.

Another object of my invention is to provide a means, in this instance, adapters, that may be assembled with the head sheets of the cylinder and, while permitting welds to be made between the head sheets and the cylinder body sheets, will be effective to prevent crushing of the head sheets and the cylinder structure.

Various other objects and advantageous features of my invention will be seen in the following description and one embodiment thereof may be seen in the accompanying drawings wherein similar characters of reference designate corresponding parts, and wherein:

Fig. 1 is a side elevation of a work holding apparatus constructed in accordance with my invention, that is, including both a primary and a secondary work holding apparatus; Fig. 2 is a sectional view taken on the line 2—2 of Fig. 1; Fig. 3 is a sectional view taken on the line 3—3 of Fig. 2; Fig. 4 is a sectional view taken on the line 4—4 of Fig. 1; Fig. 5 is an end elevation showing the means for rotating the cylinder supporting parts of the work holding apparatus; and Fig. 6 is a fragmentary sectional view taken on the line 6—6 of Fig. 2.

The apparatus will be hereinafter described as embodying a primary work holding means, or that in which various parts of a cylinder are first assembled, and a secondary work holding means, or that in which a substantially fabricated cylinder is placed to render points accessible for spot welding that were not accessible with the cylinder in the primary work holding means.

Referring to the drawings, the work holding apparatus as a whole consists of a preferably rectangular chassis or base 1 that, in this instance, is provided at each corner with gusset plates 2 arranged to rigidify the chassis construction and to receive stud portions of a series of traction elements or casters 3. A stationary pillow block 4 is rigidly mounted on one end of the chassis as shown in Fig. 1 and a movable pillow block 5 is supported on the chassis intermediate its ends. The movable pillow block 5 is mounted to slide toward and away from the pillow block 4 along the length of the chassis 1 by being supported on shafts 6 carried by the chassis 1 and extending longitudinally thereof, one end of each shaft 6 being supported in a bracket 7, and the means for moving the pillow block 5 toward and away from the pillow block 4 consists of a lead screw 8 supported in bearings 9 on the chassis 1 and extending through a threaded opening in the lowermost part 10 of the pillow block 5. A hand wheel 11 is provided on one end of the lead screw 8 whereby the lead screw may be manually rotated to result in movement of the pillow block 5 longitudinally of the chassis 1, the direction of travel depending upon the direction of rotation of the hand wheel 11.

Each of the pillow blocks 4 and 5 supports a face plate 12, one face plate 12 being rotatably mounted relative to the pillow block 4 on a stud 13 journalled in the pillow block and the other face plate 12 being rotatably mounted relative to the pillow block 5 by being mounted on a shaft 14 journalled in the pillow block 5. These face plates 12 are considerably greater in circumference than the greatest circumference of a cylinder to be fabricated whereby the head sheets will abut against each end of the cylinder body sheets and hold them in proper alignment relative to the fabricated cylinder framework. Cylinder head sheet clamping lugs 15 are provided on each face plate, these clamping lugs being movable radially inwardly and outwardly along the adjacent surfaces of the face plates 12 by means of lead screws 16 to thereby clamp different sized cylinder head sheets to the face plates.

To present all portions of a cylinder framework carried by the work holding apparatus between the face plates 12 at the desired point, the face plates may be rotated in synchronism by means of ring gears 17 that extend around the entire periphery of the face plates and mesh with pinions 18 and 19 mounted on a shaft 20 which extends substantially the entire length of the chassis 1, the pinion 19 being splined on the shaft to permit movement of the pillow block 5 towards and away from the pillow block 4 without disengagement of the pinion 19 from the ring gear 17 on the face plate 12 carried by that pillow block 5.

As shown in Figs. 1 and 5, to rotate the face plates 12, a drive pinion 20' engages the pinion 18 and the drive pinion forms a part of a sprocket 21 which is arranged to rotate on a shaft 22 and to be driven by an endless sprocket chain 23 which passes around the sprocket 21 and around a sprocket 24 on a shaft 25 journalled in the stationary pillow block 4. A hand wheel 26 provides a means for rotating the sprocket 24 and thus rotating the sprocket 21, pinion 20', pinion 18, and the shaft 20.

In the use of this apparatus so far described, the usual head sheets and lifting ribs of a cylinder structure are first properly arranged and spot welded together to form a wholly or partially fabricated framework of a cylinder. This framework is then assembled between the face plates 12 which are adjusted to the proper position and supported by the lugs 15 being moved into engagement with the head sheets which are U-shaped or flanged and assembled with the flanges extending outwardly. After the cylinder framework has been suitably disposed between the face plates 12, the parts of the cylinder structure which may include the cylinder body sheets, door guides, etc., are applied to the cylinder framework, with the face plates and framework being rotated to present the desired point on the framework at a convenient location, and substantially all welds are made except those between the cylinder body sheets and the cylinder head sheets.

As hereinbefore stated, the face plates 12 are greater in diameter than the greatest diameter of a cylinder to be fabricated therein for the purpose of holding the cylinder body sheets in proper alignment relative to the partially or wholly fabricated cylinder framework while they are being attached thereto by spot welding and, as will be apparent, this makes it impossible to spot weld the cylinder body sheets 26 to the head sheets 27, see Fig. 3, since the point at which they are welded together is inaccessible to the welding electrodes. Therefore, in accordance with my invention, a secondary holding means is provided which includes a disk 28 carried by the shaft 14 that extends through the movable pillow block 5 and carries one of the face plates 12. Pins 29 extend outwardly from the disk 28 to receive an adapter 30 that fits within the cylinder head sheets 27 as shown in Figs. 1 and 3, the adapter 30 being substantially U-shaped and being provided with notches or openings 31 extending through its peripheral flange.

A stationary pillow block 32 is carried by the frame 1 on the end remote from the pillow block 4 and supports a disk 33 similar to the disk 28 and likewise having outwardly extending pins 29 to receive an adapter 30, the face plate 33 being mounted on a stud 34 journalled in the stationary pillow block 32. The face plate 28 and adapter 30 may be moved longitudinally of the frame 1 towards and away from the disk 33 and adapter 30 carried thereby by moving the pillow block 5 longitudinally of the frame 1 through the mechanism hereinbefore described and the adapters 30 may be rotated to present any desired point of the cylinder carried by the secondary work holding means to the welding electrodes by rotating the face plate 12 carried by the shaft 14 by means of the hand wheel 26, sprocket 21, pinion 20', pinion 18, shaft 20, and pinion 19.

In the use of this secondary work holding means, the washing machine cylinder, having been partially fabricated in the primary work holding means, is removed from the primary work holding means, the adapters 30 are assembled with the head sheets 27 as shown in Figs. 1 and 3, and the partially fabricated cylinder is disposed in the secondary work holding means by properly adjusting the pillow block 5 relative to the pillow block 32 so that the pins 29 on the disks 28 and 33 will enter the openings therefor in the adapters. Then, the cylinder body sheets 26 are spot welded to the head sheets 27 by bringing the points of the welding electrodes 35 and 36 into registry with one of the plurality of notches 31 about the periphery of the adapters 30, the cylinder and adapters being rotated as desired to present the desired notch to the welding electrodes. After completion of the operation of welding the cylinder body sheets 26 to the head sheets 27 and any other welding operations which could not be accomplished in the primary work holding means, the cylinder is removed from the secondary work holding means and the usual cylinder end heads supplemented for the adapters 30 and properly attached to the cylinder.

With the above construction, I have provided a work holding apparatus for use in fabricating a washing machine cylinder which includes a primary work holding means wherein a cylinder is partially fabricated and a secondary work holding means which permits all welding operations which it is not possible to perform in the primary work holding means to be readily accomplished. The combination of such primary and secondary work holding means in one apparatus provides for a minimum number of operating parts and controls while, at the same time, providing a work holding apparatus wherein a washing machine cylinder may be completely fabricated without danger of the parts thereof being moved out of alignment with each other prior to their attachment to other parts.

What I claim is:

1. Work holding apparatus for fabricating a cylinder having body sheets and circular head sheets with outwardly extending peripheral flanges longitudinally coextensive with said body sheets, comprising in combination a chassis, stationary pillow blocks spaced apart thereon, one of said blocks having a face plate rotatably mounted thereon and greater in diameter than the diameter of the cylinder to be fabricated, the other of said blocks rotatably supporting an adapter having a diameter adapted to lie within the flange of a head sheet, an intermediate pillow block having rotatably mounted on opposite sides thereof a face plate and adapter like the first named plate and adapter and facing the similar members, and means for moving said intermediate pillow block along said chassis, whereby to clampingly secure firstly said body sheets and the flanged portion of said head sheets in abutting relation between said face plates and secondly to secure the central portions of the head sheets between said adapters.

2. The combination of claim 1 in which said adapter is U-shape in section with a peripheral flange extending away from the cylinder body, there being openings through said flange for the insertion of a fabricating tool.

3. Work holding apparatus for fabricating a cylinder having body sheets and a circular head sheet with an outwardly extending peripheral flange, comprising an adapter U-shape in section with a peripheral flange of a diameter adapted to lie within the flange of the head sheet, there being openings through said adapter flange, and means for holding said adapter against a head sheet with the flanges extending in the same direction.

4. Work holding apparatus of the character described, comprising an elongated chassis, a stationary pillow block at each end thereof, one of said pillow blocks having a face plate thereon greater in diameter than the diameter of a cylinder to be fabricated and the other of said pillow blocks having a face plate thereon less in diameter than the diameter of said cylinder, an intermediate pillow block adjustable to various positions longitudinally of said chassis and having face plates on opposite sides thereof corresponding to said face plates of greater and lesser diameters respectively and like face plates facing each other, to thereby provide selectively usable main and supplemental cylinder holding means on said chassis, and means for rotating said face plates.

ELMER J. GRAY.